United States Patent Office 3,447,644
Patented June 3, 1969

3,447,644
TWO STAGE SHOCK ABSORBER
William A. Duckett, Kingsway, England, assignor to Woodhead Manufacturing Company Limited, Kingsway, England, a company of Great Britain
Filed Mar. 9, 1967, Ser. No. 621,987
Claims priority, application Great Britain, Mar. 17, 1966, 11,751/66
Int. Cl. F16d *57/00*
U.S. Cl. 188—88                                        8 Claims

ABSTRACT OF THE DISCLOSURE

The invention relates to a hydraulic shock absorber of the telescopic hydraulic type having a subsidiary piston mounted on the piston rod arranged to engage a subsidiary cylinder positioned in the end of the cylinder. A leakage path is provided between the subsidiary piston and cylinder which progressively diminishes towards the end of the stroke so as to offer resistance to the subsidiary piston the further it enters the subsidiary cylinder. A non return valve means permits flow of fluid only into the subsidiary cylinder, the non return valve means and the leakage path between them providing controlled movement of the subsidiary piston out of the subsidiary cylinder.

---

This invention relates to vibration dampers such as are used in vehicle suspension systems to control relative movement between sprung and unsprung parts of the vehicle and are usually called "shock absorbers" (which term will therefore be used hereinafter for convenience) and is concerned with shock absorbers of the hydraulic telescopic type, that is to say of the kind comprising a working cylinder closed at one end and containing fluid, a working piston arranged to slide within the working cylinder and connected to a piston rod extending through a fluid seal at the other end of the cylinder, means being provided which permit but afford resistance to the flow of fluid from one side of the working piston to the other.

In some cases the fluid is a liquid while in other cases it is partly liquid and partly in the form of a compressed gas in which case it may be partly or wholly in the form of an emulsion of liquid and gas, at least during operation. The term working fluid will therefore be used herein when appropriate as including a liquid or an emulsion or other mixture of liquid and gas while the term "pressurised" will be used to refer to a shock absorber of the kind in question in which the working fluid is partly liquid and partly gaseous and is under pressure.

Shock absorbers of the kind referred to have in recent times been designed to suit the low frequency, or so called "soft" suspension systems employed in many passenger vehicles and, in order to reduce the harshness of the shock loads transmitted to the sprung parts of a vehicle when the shock absorbers reach the ends of their travel, so called rubber bump stops and/or rebound rubbers have been provided to check the relevant movement of the sprung and unsprung parts of the vehicle as they approach the limit of their relative movement in one or each direction. Such rubber bump stops and rebound rubbers are however themselves storers of energy and the forces transmitted by them to the sprung part of the vehicle are often therefore as objectionable as the more intense forces of only instantaneous duration which would be transmitted without them. Thus they essentially apply a resistance to the relative movement they are intended to check which starts at a minimum when the speed of such relative movement is highest and rises to a maximum at the moment when such relative movement is finally checked, after which they act to initiate and accelerate relative movement in the opposite direction.

Various arrangements have been proposed in shock absorbers of the kind referred to in which, towards the end of the relative movement of the working piston and cylinder (hereinafter called the main piston and cylinder respectively) in one direction at least, a subsidiary piston connected to and of smaller diameter than the main piston enters a subsidiary cylinder which is disposed at the appropriate end of the main cylinder, the subsidiary piston and cylinder being formed so as to provide between them a limited leakage path by which the working fluid can flow from the subsidiary cylinder into the main cylinder so that, when the subsidiary piston has entered the subsidiary cylinder an additional resistance to relative movement between the main cylinder and piston is superimposed upon the resistance due to the resistance to flow of fluid from one side to the other of the main piston. It has also been proposed to provide a non return valve through which, during movement of the subsidiary piston out of the subsidiary cylinder, liquid can flow in a free and unrestricted manner into the subsidiary cylinder.

It is an object of the present invention to provide a shock absorber of the telescopic hydraulic type in which not only will the resistance to relative movement imposed on the main cylinder and piston by the resistance to fluid flow from one side to the other of the main piston be appropriately controlled but, towards one end at least of the relative movement between the main piston and cylinder, an additional resistance to relative movement will be imposed upon the main piston and cylinder, which additional resistance can be determined in accordance with requirements so as to transmit no objectional shock loads to the sprung part of the vehicle suspension in which the shock absorber is employed and thus make a rubber bump stop and/or rebound rubber unnecessary while enabling the characteristics of the initial part of the subsequent return movement of the main piston relative to the main cylinder to be controlled in accordance with requirements, all for the purpose of retaining the advantage of the desirable characteristics of a "soft" suspension system without the disadvantage hitherto experienced due to lack of satisfactory control of the relative movements of the sprung and unsprung parts of the vehicle over the end portions of these relative movements.

To this end a shock absorber of the hydraulic telescopic type according to the present invention comprises a main cylinder closed at one end, a main piston arranged to slide in the main cylinder and connected to a piston rod extending through a fluid seal in the other end of the main cylinder, fluid control means comprising passages arranged to permit but afford resistance to the flow of fluid from one side of the main piston to the other, and subsidiary control means comprising a part positioned adjacent to at least one end of the main cylinder and constituting a subsidiary cylinder into co-operating engagement with which a subsidiary piston on the piston rod comes when the main piston approaches such end of the main cylinder, such subsidiary piston and cylinder being formed to provide a leakage path the cross sectional area of which, after entry of the subsidiary piston into engagement with the subsidiary cylinder, progressively diminishes with further movement of the subsidiary piston in the same direction, and valve means (hereinafter for convenience called non-return valve means) including a valve member which is resiliently urged towards its seating and arranged so that when the subsidiary piston is in engagement with the subsidiary cylinder the valve member prevents or severely restricts flow of fluid through the non-return valve means out of the subsidiary cylinder so that fluid flow out of the subsidiary cylinder will take place solely or mainly through said leakage path, but permits flow of fluid relatively freely through the non-return valve means into the subsidiary cylinder but under the restraint afforded by the resilient force urging the valve member towards its seating, without such fluid flow also traversing the leakage path, so that fluid flow into the subsidiary cylinder may take place independently through said valve means and through said leakage path.

In some constructions the non-return valve means may be incorporated in the auxiliary piston so that flow into the subsidiary cylinder through the valve means takes place from the adjacent end of the main cylinder.

In other cases the non-return valve means may be arranged to permit flow into the subsidiary cylinder from a fluid reservoir into and out of which fluid is caused to flow with movement of the main piston and cylinder.

In any event the leakage path of progressively diminishing cross sectional area referred to may be provided by making the bore of the subsidiary cylinder frusto-conical or otherwise appropriately tapered or by forming in it longitudinally extending tapered leakage slots.

Various constructions of shock absorber according to the invention are shown by way of example in the accompanying drawings, in which.

In the construction shown in FIGURES 1, 2, 2A and 4 the shock absorber comprises a main cylinder 10 closed at its lower end by an end cap 11 while a piston rod 12 extends through a sealing assembly, indicated generally at 13, at its upper end, the sealing assembly including an annular end cap 14, at the upper end of the main cylinder. Surrounding and rigid with the main cylinder 10 is a concentric cylinder 15 of larger diameter than the main cylinder and extending between and attached to the end caps 11 and 14 to form between it and the main cylinder a fluid reservoir 16 which communicates with the interior of the main cylinder through fluid transfer ports 17. The piston rod 12 and the end cap 11 respectively have secured to them sockets 18 and 19 for attachment in conventional manner respectively to the parts between which vibration is to be damped (for example the sprung and unsprung parts of a vehicle) while a disc 20 rigidly secured to the piston rod has rigidly connected to it a tubular dirt shield 21 concentric with and of slightly larger diameter than the cylinder 15 and of such length that when the piston rod is in its uppermost position relatively to the main cylinder 10 the lower end of the shield 21 still surrounds the upper end of the cylinder 15.

Figure 1:
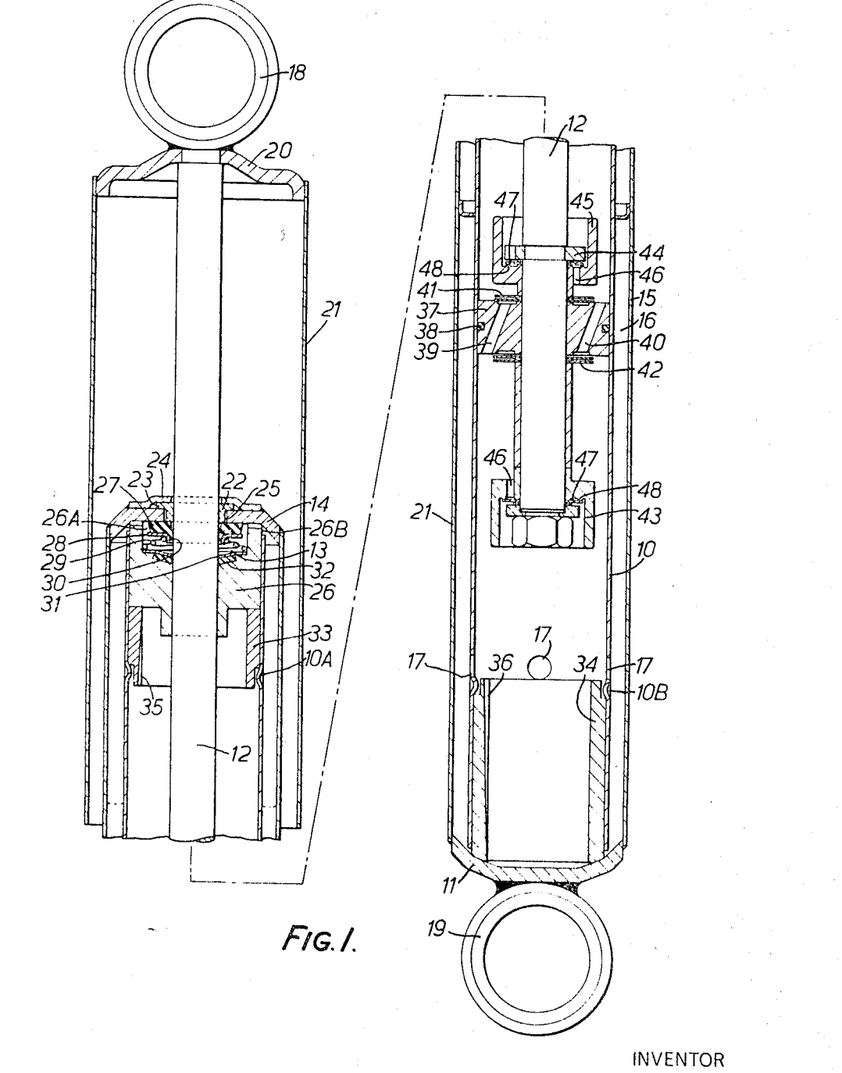
FIGURE 1 is a sectional cross section of one form of pressurised shock absorber according to the invention in a plane containing the axis of the main cylinder.

The sealing assembly indicated generally at 13 comprises a dirt-excluding ring 22 through the bore of which the piston rod extends with a close but free fit, this ring having a radially extending flange 23 which is located closely but freely between a dished plate 24 and the end cap 14. The bore of the sealing ring 22 may be formed of self-lubricating material such as sintered bronze containing an appropriate ingredient or ingredients. As will be seen there is a small annular gap 25 between the bore of the end cap 14 and the part of the sealing ring 22 which lies therein, to enable the sealing ring 22 to take up its correct position of alignment with the rod 12 and thus prevent the occurrence of any heavy radial loading between the bore of the sealing ring and the rod. Rigidly secured within the cylinder 10 is a guide member 26 through which the piston rod 12 can slide freely but with a close fit and disposed within a cup-like recess in the upper end of this guide member is a fluid sealing assembly comprising a ring 27 of rubber or like resilient material formed and arranged so that in its undistorted state it is of generally frusto-conical form with a cylindrical bore whereas when it is assembled it is maintained flat by a plate 28 under the action of a spring 29 so that its bore tends to take a frusto-conical form and has a lip 30 at its lower end pressing against the piston rod 12. The bore of the plate 28 is slightly larger than that of the lip 30 and is formed as shown so that the lip enters this bore, the arrangement being such that the interior of the cylinder 10 can be charged under pressure through the bore of the ring 28 but the escape of fluid under pressure from the interior of the cylinder 10 is then prevented by the lip 30.

As will be seen, the lower end of the spring 29 abuts against a cup-shaped washer 31, which in turn bears on a sealing ring 32 of inverted but otherwise generally similar form to the sealing ring 27. The chamber 26A between the sealing rings 27 and 32 communicates through passages 26B with the reservoir 16.

Rigidly located within the cylinder 10 immediately below the guide member 26 is a cylindrical sleeve 33, constituting a subsidiary cylinder, the parts 26 and 33 being held in place between an internal rib 10A in the cylinder 10 and the end cap 14 as shown. A somewhat longer sleeve 34 constituting another subsidiary cylinder is similarly secured within the lower end of the main cylinder between the end cap 11 and an annular rib 10B. The sleeve 33 has formed in its bore a longitudinally extending tapered leakage slot 35, while the sleeve 34 has similarly formed in its bore a longitudinally extending tapered leakage slot 36 and the open ends of the bores of the two sleeves are slightly chamfered.

A piston and valve assembly is mounted on the lower end portion of the rod 12 and comprises a main piston 37 having a piston ring 38, to maintain a substantially fluid-tight seal between it and the bore of the main cylinder 10 while passages 39 and 40 extend through the piston and are controlled respectively by plate valve means 41 and 42 so arranged as to permit fluid flow upwards through the passage 39 but not downwards, and to permit fluid flow downwards through the passages 40 but not upwards. Thus, assuming the main cylinder 10 to be filled with fluid, the passages 39 and 40 and their associated valve means provide means permitting while resisting movement of the main piston within the cylinder respectively in the downward and upward direction, the resistance characteristics afforded during the downward movement being determined by the passages 39 and valve means 41 while the resistance characteristics for movement of the piston upwards are determined by the passages 40 and valve means 42. Also rigidly secured to the piston rod and spaced thereon downwardly from the main piston 37 is a subsidiary piston 43 having an external diameter slightly less than that of the bore of the subsidiary cylinder 34 the arrangement being such that the subsidiary piston 43 enters the bore of the subsidiary cylinder 34 towards the end of the maximum downward movement of the piston rod 12 relatively to the main cylinder 10 whereupon the subsidiary piston 43 makes with the bore of the subsidiary cylinder 34 a reasonably fluid-tight seal, except for the leakage path provided by the notch 36. Rigidly connected to the piston rod 12 at a point above the main piston 10 and held in place by a split collet 44 engaging a groove in the piston rod, is a second subsidiary piston 45 having an external diameter slightly less than that of the bore of the subsidiary cylinder 33 so that towards the end of the maximum upward movement of the piston rod 12 relatively to the main cylinder 10 the subsidiary piston 45 will enter the bore of this subsidiary cylinder 33 and make therewith a reasonably fluid-tight seal except for the leakage path provided by the notch 35. Each of the subsidiary pistons 43 and 45 has passages 46 extending through it and controlled by non return valve means comprising a valve member in the form of a resilient plate valve 47 the edge portion of which is urged by the resilience of the valve member into sealing engagement with an annular seating 48 surrounding the adjacent ends of the passages 46.

When either of the subsidiary pistons 43 and 45 lies within its associated subsidiary cylinder 34 or 33 the valve member 47 associated with that subsidiary piston prevents flow of fluid out of the subsidiary cylinder through the passages 46 but permits flow of fluid into the subsidiary cylinder through such passages under the restraint afforded by the resilient force urging the edge portion of the associated valve member 47 towards its seating 48.

In use, assuming the sockets 18 and 19 of the shock absorber to be connected to sprung and unsprung parts of a vehicle respectively and to occupy the relative position shown in the drawing (this being the normal relative position), when the shock absorber has been operated a few times due to the vehicle travelling over uneven ground, say six to eight times, the gaseous part of the working fluid in the main cylinder will have been, largely at least, displaced through the sealing ring 32 and the chamber 26A into the reservoir 16, so that after these small number of operations the main cylinder 10 is substantially completely filled with oil while the reservoir 16 has a column of oil at the bottom and a column of gas at the top. When the shock absorber is operated further the gas and oil columns in the reservoir 16 may or may not start to amalgamate to form an emulsion in the reservoir 16 while a substantially solid column of oil remains in the main cylinder. For movements of the main piston relatively to the main cylinder in either direction there occurs an increase in pressure on the appropriate side of the main piston accompanied by a reduction in pressure on the opposite side of the piston, thus creating a pressure differential across the piston, and flow through the appropriate passages in the piston against a resistance determined by the characteristics of such passages. During such operation the air content of the reservoir 16 whether partially or wholly emulsified with liquid or not, acts as an elastic fluid allowing for the displacement of fluid by the piston rod 12 so that while downward movement of the main piston is resisted it can take place.

It will be seen that the reservoir 16 does not therefore have to be of the capacity normal for bitubular shock absorbers operating with liquid only in which the corresponding reservoir has to have a volumetric capacity sufficient to accommodate the greater proportion at least of the working liquid.

In the construction shown when the suspension apparatus is subject to forces such that the main piston 37 is moving rapidly when it approaches the end of its maximum travel in one direction or the other, the subsidiary piston 43 or 45, as the case may be, enters its associated subsidiary cylinder 34 or 33, as the case may be, so that the fluid within the subsidiary cylinder 34 or 33 is put under pressure but can escape through the graduated notch 36 or 35 the effective dimensions of which will progressively decrease as the subsidiary piston continues to travel towards the closed end of its associated subsidiary cylinder. A controlled resistance to relative movement between the piston rod 12 and cylinder 10 in addition to that imposed by the main piston is therefore imposed on the assembly towards each end of the range of relative movement of the main piston and cylinder, this additional resistance being at any moment a function jointly of the instantaneous speed of relative movement of the main piston and cylinder parts and the effective cross sectional area of the notch 36 or 35.

Even in the case of a shock load causing the main piston to approach the end of its travel relatively to the main cylinder, therefore, the relative movement between the sprung and unsprung parts of the vehicle in either direction from the normal position shown can thus be checked in a manner so controlled throughout the checking operation as to prevent the transmission to the sprung part of vehicle of objectionable shock loads.

If after the relative movement between the sprung and the unsprung parts of the vehicle has been thus checked in either direction in the manner described so that the appropriate subsidiary piston lies within its associated cylinder, the subsidiary piston were to be free to withdraw from its subsidiary cylinder substantially without resistance, there would be rapid initial acceleration of the sprung part relatively to the unsprung part of the vehicle up to the speed at which the main piston became effective and this would result in the transmission of undesirable loads to the sprung part of the vehicle. The valve members 47 serve to permit such return movement under a predetermined controlled resistance so that throughout the whole operation of checking the relative movement between the sprung and unsprung parts of the vehicle and the return of such parts to their normal relative position, after the suspension system has been subjected to a shock load, the transmission of unpleasant forces to the sprung part of the vehicle tends to be prevented.

It will be apparent that by varying the position of one or each of the pistons 43 and 45 on the piston rod 12, and/or the point or points in the total travel of the main piston at which one or each of the subsidiary pistons enters its subsidiary cylinder, and/or the dimensions of the slots 35 and/or 36 both as regards cross sectional area and length and/or the resistance to flow afforded by the valve members 47, the shock absorber can be made to suit, to the best advantage, the suspension characteristics of different suspension systems.

Figures 3, 3A, 4, 5:
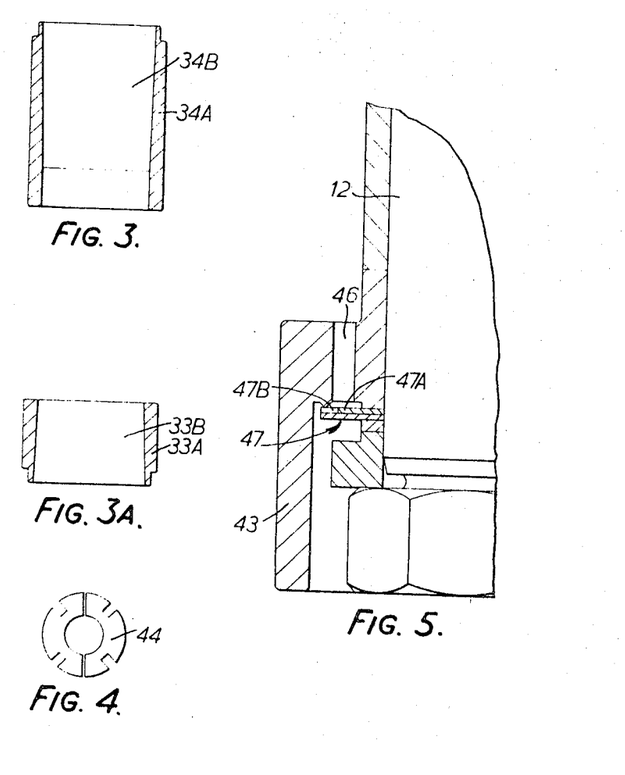
FIGURES 3 and 3A are similar views to FIGURES 2 and 2A of modified forms of subsidiary cylinders which may be used instead of those shown in FIGURES 1, 2 and 2A.
FIGURE 4 is a plan view of one of the split collets used in the construction shown in FIGURE 1.
FIGURE 5 is an enlarged cross section showing a modification of one of the subsidiary piston assemblies applicable to FIGURE 1.

FIGURES 3 and 3A show modified forms of subsidiary cylinder 33A and 34A which may be employed in a shock absorber as shown in FIGURE 1 instead of the subsidiary cylinders 33 and 34 respectively, the subsidiary cylinders 33A and 34A having tapered bores 33B and 34B instead of the slots 35 and 36.

In the modification shown in FIGURE 5 which is to be assumed to be applied to the subsidiary piston 43 of a shock absorber otherwise similar to that shown in FIGURES 1, 2, 3 and 4, there is interposed between the valve 47 and its seat 48 a metering disc 47A having formed therein one or more bleed notches 47B which thus permit a degree of bleed upwards past the valve member 47 determined by the width and number of the notches 47B and the thickness of the metering disc 47A.

Figure 6:
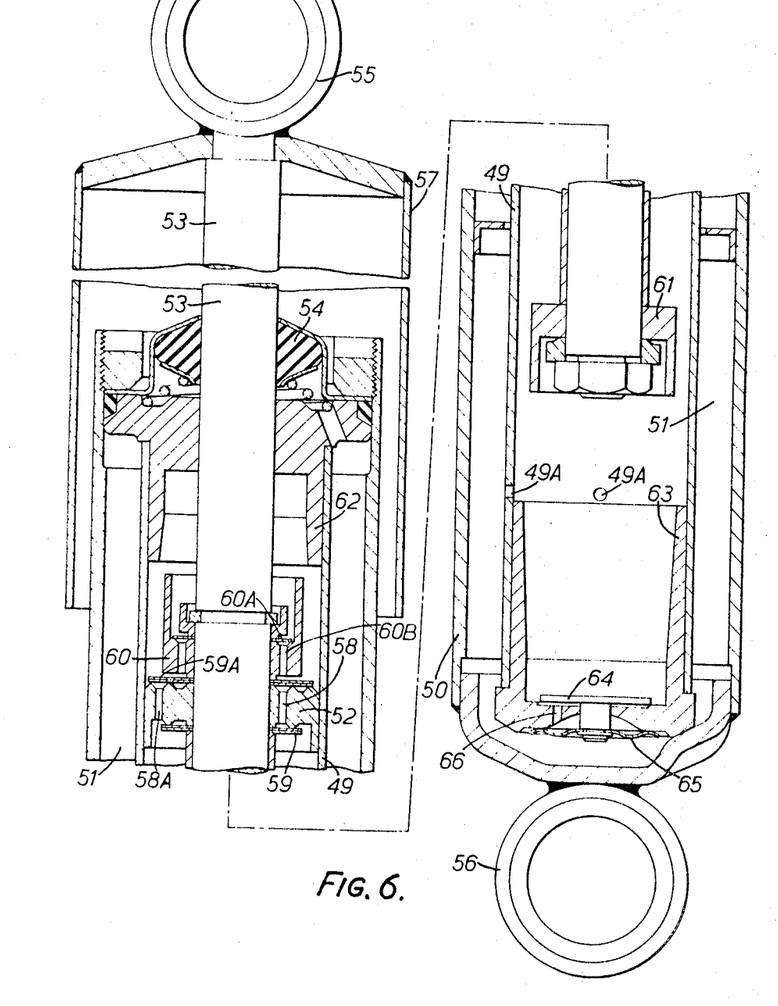
FIGURE 6 is a similar view to FIGURE 1 of another form of shock absorber according to the invention.

In the form of shock absorber shown in FIGURE 6 the shock absorber comprises a main cylinder 49 surrounded by a concentric outer cylinder 50 so as to provide an annular fluid reservoir 51 between the two cylinders.

Arranged to slide within the main cylinder 49 is a main piston 52 rigidly mounted upon a piston rod 53 which passes through a fluid tight seal 54 in the upper end of the cylinder 49, the upper end of the piston rod being provided with a socket 55 for connection to a sprung part of a vehicle suspension system while a socket 56 at the lower end of the cylinder assembly 49, 50 is provided for connection to an unsprung part of the suspension system. The piston rod 53 also carries an outer protective sleeve 57 in conventional manner. The main piston 52 is provided with passages 58, 58A through it controlled by valves 59, 59A in a similar manner to the construction described with reference to FIGURES 1, 2 and 3 but in FIGURE 6 the cylinder 49 is normally filled with working liquid at all times as hereinafter more fully explained. In addition passages 49A are provided between the main cylinder 49 and the reservoir 51.

Also mounted upon the piston rod 53 are an upper subsidiary piston and a lower subsidiary piston 60, 61 respectively which are arranged so that towards the ends of the upward and downward movements of the piston rod they enter respectively an upper subsidiary cylinder 62 and a lower subsidiary cylinder 63, these subsidiary cylinders having tapered bores so that when either of the subsidiary pistons 60, 61 enters its associated subsidiary cylinder there is a leakage path between the subsidiary piston and cylinder the cross sectional area of which diminishes progressively as the subsidiary piston continues to move in the same direction.

Arranged in the base of the lower subsidiary cylinder 63 is a non return valve device comprising a valve member in the form of a disc 64 the edge portion of which constitutes the valve proper, which is urged by a spring 65 towards an annular seating surrounding a recess in which lie the upper ends of passages 66 communicating with the reservoir 51. The valve 64 thus prevents flow of liquid out of the subsidiary cylinder 63 into the reservoir 51 but permits flow of liquid from the reservoir 51 into the subsidiary cylinder 63 against a resistance resulting from and determined by the force applied to the valve member 64 and urging it towards its seating.

The total resistance to movement of the subsidiary piston 61 out of the subsidiary cylinder 63 is thus a function jointly of the resistance to flow past the piston 61 and the resistance to flow past the valve 64, the latter resistance being independent of the former so that the total resistance can be controlled by giving to the valve 64 appropriate characteristics, to provide any desired degree of resistance less than that due to the restricted flow past the piston 61.

An arrangement for permitting relatively free flow into the upper subsidiary cylinder 62 is also provided comprising a valve 60A controlling ports 60B in the subsidiary piston 60 so as to prevent flow out of the subsidiary cylinder 62 through the ports 60B when the subsidiary piston 60 is in engagement with the subsidiary cylinder 62 but permit flow into the subsidiary cylinder 62 through these ports against a resistance dependent upon the characteristics of the valve 60A.

In this construction it will be seen that the non return valve 64 acts not only in the manner indicated above to control the resistance offered to movement of the subsidiary piston 61 out of the subsidiary cylinder 63 but also as a recuperation valve to ensure that the main cylinder 49 is always full of liquid. The operation of the shock absorber is as follows.

The operation of the main piston 52 and main cylinder 49 is the same as that of the main piston 37 and cylinder 10 of the construction described with reference to FIGURES 1 to 4 except that the shock absorber is not pressurised, that is to say the working fluid is not under pressure and the main cylinder is always maintained full of liquid by reason of the operation of the valve 64 as a recuperation valve, and the control of the resistance to movement of the main piston 52 in the main cylinder is in part a function of the resistance to flow afforded by the passages 49A.

For normal relative displacement of the sprung and unsprung parts of the vehicle from their normal position the main piston and cylinder thus operate as indicated. When a shock load is encountered however, causing such relative movement as to cause downward movement of the piston rod 53 relatively to the main cylinder 49 to a point where the subsidiary piston 61 enters the subsidiary cylinder 63 there is imposed upon the piston rod 53 an additional resistance to downward movement the law governing this additional resistance being determined by the form and dimensions of the taper in the bore of the subsidiary cylinder 63. When the downward movement of the piston rod 53 has been checked and the return upward movement takes place the initial part of such upward movement while the subsidiary piston 61 is still within the subsidiary cylinder 63 has imposed upon it a resistance dependent jointly upon the characteristics of the leakage path past the piston 61 and those of the recuperation valve 64.

In this construction an additional resistance to upward movement of the piston rod 53 is also applied towards the end of the maximum upward movement by the subsidiary piston 60 entering the subsidiary cylinder 62 so as to check what is commonly called "rebound" towards the end of the upward travel of the piston rod, and the resistance to the return downward movement of the piston rod after such rebound has been checked is a function jointly of the characteristics of the leakage path for flow of liquid into the subsidiary cylinder past the piston 60 due to the tapered bore of the cylinder 62 and the characteristics of the valve 60A.

Figure 7:
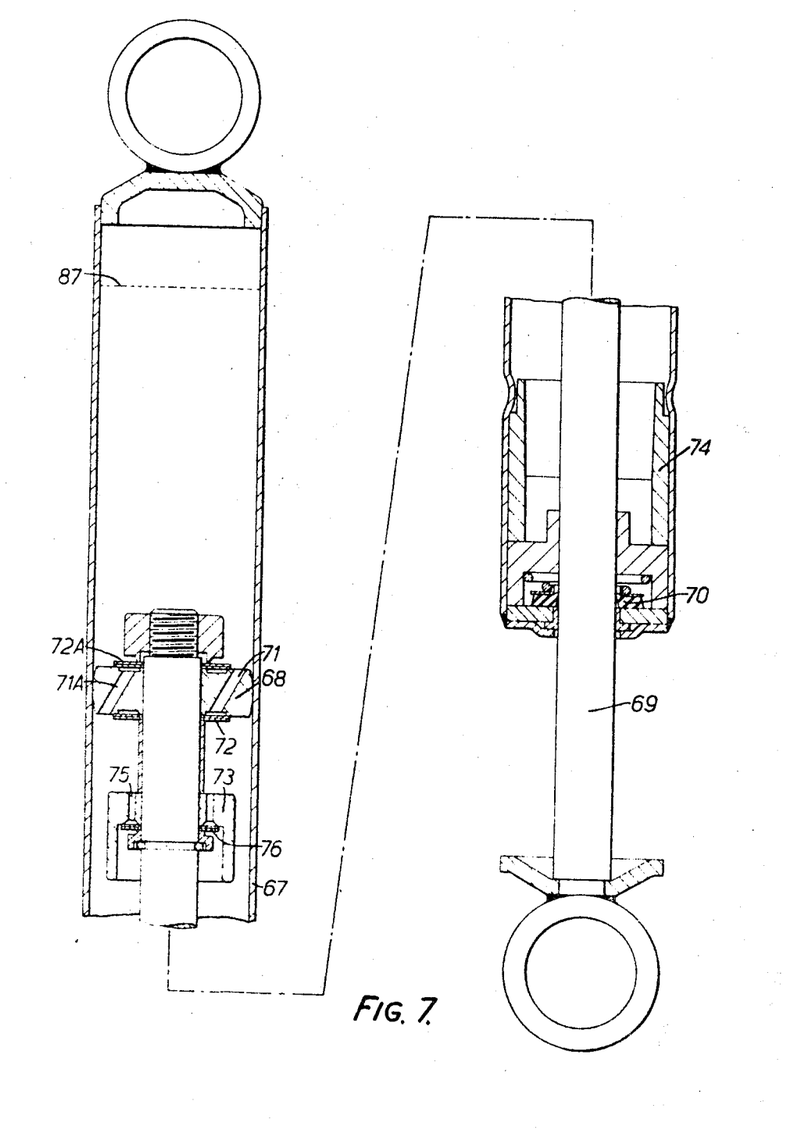
FIGURE 7 is a similar view to FIGURE 1 of a still further form of shock absorber according to the invention.

In the construction shown in FIGURE 7 the shock absorber is of the pressurized type and comprises a main cylinder 67 closed at its upper end and having arranged to slide within it a main piston 68 connected to a piston rod 69 which passes through a fluid tight sealing assembly 70 at the lower end of the cylinder 67, the cylinder 67 being filled partly with liquid and partly with pressurised gas and the main piston 68 being provided with passages 71, 71A and valves 72, 72A similar to those employed in the main piston of the construction shown in FIGURE 1 and which will therefore not be again described.

In the construction shown in FIGURE 7 the piston rod 69 has mounted on it at a short distance below the main piston 68 a subsidiary piston 73 which is arranged to enter a subsidiary cylinder 74 at the lower end of the main cylinder 67 towards the end of the downward movement of the piston rod 69 relatively to the main cylinder 67. In this construction the subsidiary piston 73 has formed in it passages 75 controlled by a spring plate valve 76 arranged to seat on a seating surrounding the adjacent ends of the passages 75 so as to permit downward flow but prevent upward flow through the passages 75. When the subsidiary piston 73 is within the subsidiary cylinder 74, therefore, the plate valve 76 prevents flow of liquid through the passages 75 out of the subsidiary cylinder 74 but permits flow of liquid from the main cylinder 67 into the subsidiary cylinder 74 through these passages against a resistance dependent upon the spring characteristics of the plate valve 76.

The total resistance initially offered to upward movement of the piston rod 69 during re-compression, after an extreme rebound movement has caused the subsidiary piston 73 to enter the subsidiary cylinder 74, is a function jointly of the resistance to flow through the leakage path due to the tapered bore of the subsidiary cylinder 74 and of the resistance to flow offered by the valve 76.

Figure 8:
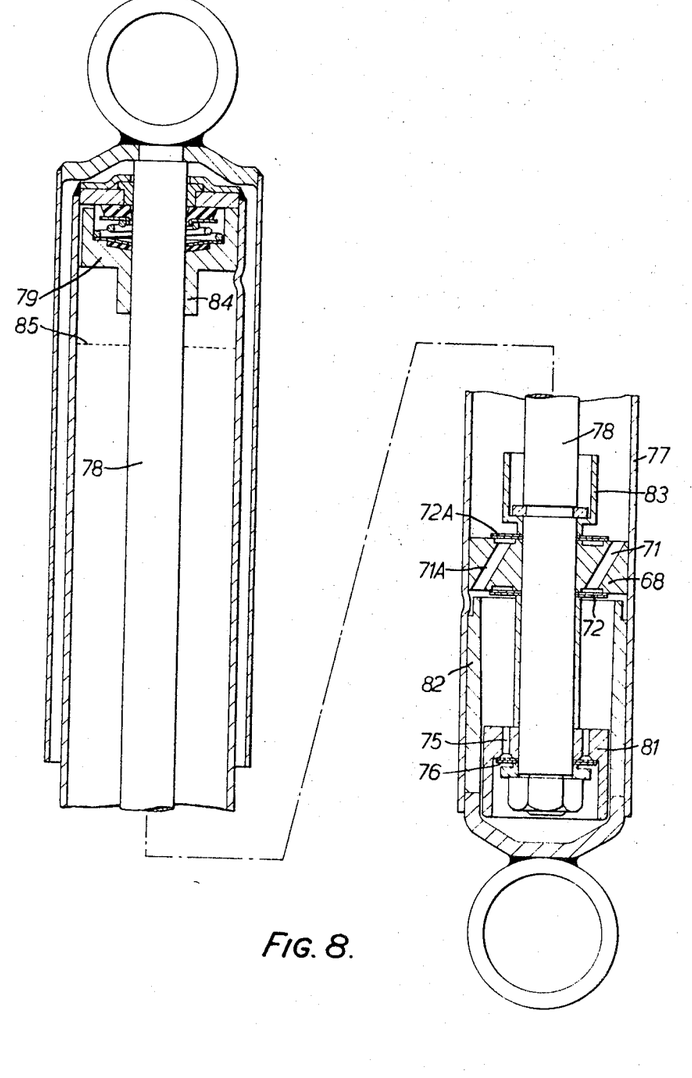
FIGURE 8 is a similar view to FIGURE 1 of a still further form of the shock absorber according to the invention.
Figure 9:
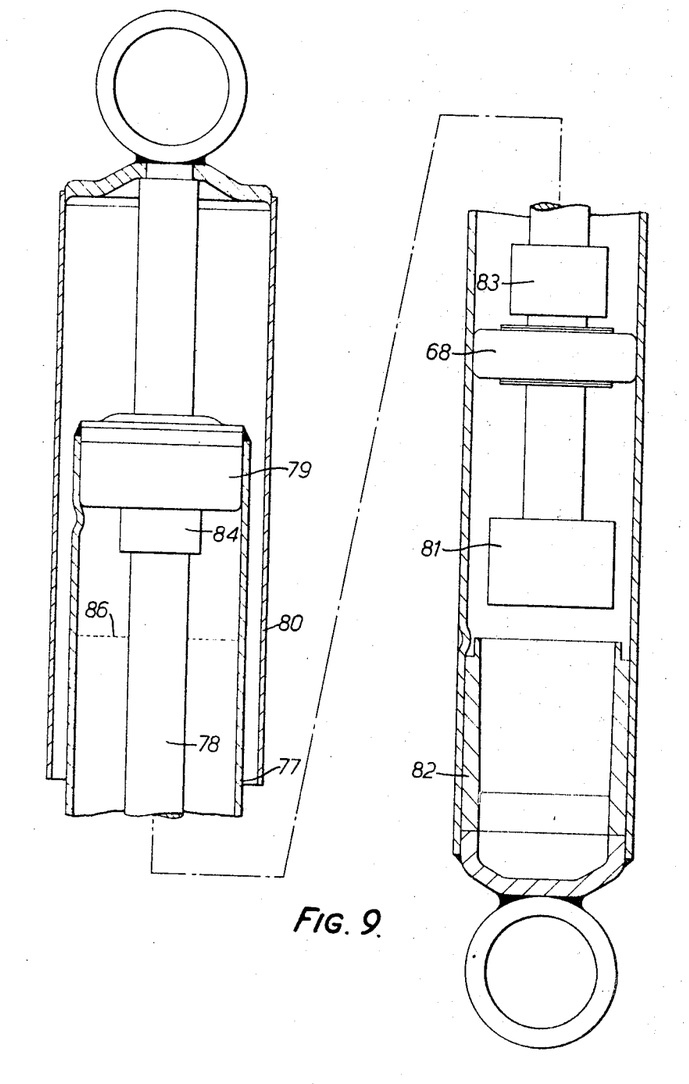
FIGURE 9 is a side elevation partly in cross section of the construction shown in FIGURE 8 demonstrating how changes in fluid level occur with relative movement between the main cylinder and piston in this construction.

In the construction shown in FIGURES 8 and 9 the shock absorber is of a similar general type to that shown in FIGURE 7 and comprises a main cylinder 77 arranged with the closed end at the bottom while the piston rod 78 passes through a sealing assembly 79 at the upper end of the main cylinder and also carries a tubular protective sleeve 80 in conventional manner. In this construction the main piston assembly is similar to that shown in FIGURE 7 and has been given a corresponding reference numeral and will not again be described. The piston rod 78 has secured to it at a point downwardly displaced from the main piston 68 a subsidiary piston 81 which, towards the end of the downward movement of the piston rod 78 enters a subsidiary cylinder 82 having a tapered bore. The subsidiary piston 81 is moreover provided with passages 75 and a plate valve 76 similarly arranged to those of the subsidiary piston 73 in the construction shown in FIGURE 7, while also carried by the piston rod 78 is an upper subsidiary cylinder 83 which co-operates with a downward projection 84 constituting a piston secured to the upper end of the main cylinder 77 to check upward movement of the piston rod 78 before it reaches the end of its upward travel should the suspension system with which the shock absorber is used encounter a condition involving a high degree of rebound.

The operation of the main piston and cylinder and of the subsidiary piston 81 and cylinder 82 are similar to those respectively of the main piston and cylinder and of the subsidiary piston 73 and cylinder 74 in the construction shown in FIGURE 7.

It will be appreciated that the arrangement employing the subsidiary cylinder 83 on the piston rod ensures that this cylinder will be substantially filled with working liquid, or working emulsion as the case may be if and when it moves into co-operating engagement with the projection 84.

In the construction shown in FIGURE 7 and in FIGURES 8 and 9, in which, as mentioned, the shock absorber is pressurised so that the main cylinder is filled with liquid and gas under pressure, the so-called displacement of working fluid by the piston rod as it moves relatively to the main cylinder will be allowed for by the appropriate degree of expansion and contraction of the gaseous component of the working fluid, whether at any time the liquid and gas are wholly or partly in the form of an emulsion or are mainly or wholly distinct, in which case the gaseous component will occupy the upper part of the main cylinder. Thus, assuming this to be the case the liquid level would be as indicated at 85 in FIGURE 8 when the piston rod 78 is at the bottom of its travel and as indicated at 86 in FIGURE 9 when the piston rod occupies the intermediate position shown in FIGURE 9. Similarly in FIGURE 7 the level indicated at 87 would rise with upward movement of the piston rod 69 and fall with downward movement of this rod from the position shown.

Figure 2:
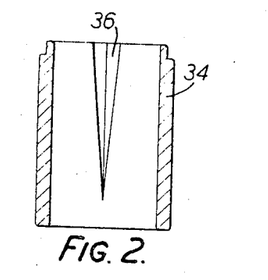
FIGURES 2 and 2A are cross sections respectively through the lower and upper subsidiary cylinders of the construction shown in FIGURE 1 in a plane containing the axis of the subsidiary cylinders and at right angles to the plane of FIGURE 1.
Figure 2A:
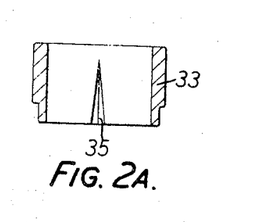

It will be understood that in any of the constructions shown the subsidiary cylinder or one or each of the subsidiary cylinders may be provided either with a tapered bore or one or more tapered notches similar to the notches 35 and 36 shown in FIGURES 2A and 3A.

What I claim as my invention and desire to secure by Letters Patent is:

1. A hydraulic shock absorber including
a main cylinder closed at one end,
a main piston assembly arranged to slide in said cylinder and having at least one passage therein permitting but offering resistance to the flow of fluid from one side thereof to the other and constituting main control means,
a piston rod connected to said piston, fluid sealing means through which said piston rod extends disposed on the other end of said main cylinder, and
subsidiary control means comprising a part positioned adjacent to at least one end of the main cylinder and constituting a subsidiary cylinder.
a subsidiary piston on said piston rod arranged to enter said subsidiary cylinder when the main piston approaches such end of the main cylinder, said subsidiary piston and cylinder being a close but free sliding fit and formed to provide a leakage path the cross sectional area of which after entry of the subsidiary piston into engagement with the subsidiary cylinder progressively diminishes with further movement of said subsidiary piston into said subsidiary cylinder,
subsidiary passage means separate and apart from any passage means in said main piston assembly for flow of fluid into and out of said subsidiary cylinder when engaged by said subsidiary piston, and
non return valve means controlling said subsidiary passage means and comprising a valve member and resilient means urging said valve member towards its seating to control said flow of fluid into said subsidiary cylinder throughout substantially the whole of the travel of the subsidiary piston out of the subsidiary cylinder and substantially prevent said flow of fluid out of said subsidiary cylinder through said subsidiary passage means.

2. A hydraulic shock absorber as claimed in claim 1, in which said subsidiary cylinder is formed with a tapered bore forming the said leakage path.

3. A hydraulic shock absorber as claimed in claim 1 in which the subsidiary cylinder is formed with at least one longitudinally extending tapered slot forming said leakage path.

4. A hydraulic shock absorber of the hydraulic telescopic type as claimed in claim 1 in which the shock absorber is pressurized.

5. A hydraulic shock absorber as claimed in claim 4 including a fluid reservoir in communication with the main cylinder.

6. A hydraulic shock absorber as claimed in claim 5 in which a concentric cylinder surrounds and is spaced radially from said main cylinder to form an annular chamber, said annular chamber constituting said fluid reservoir.

7. A hydraulic shock absorber as claimed in claim 1, including a fluid reservoir, said subsidiary passage means and said non return valve means controlling flow of fluid into and out of said fluid reservoir with movement of said main piston in said main cylinder.

8. A hydraulic shock absorber as claimed in claim 7 in which the shock absorber is unpressurized and said non return valve is situated adjacent the closed end of the main cylinder, said closed end being positioned lowermost the non return valve constituting recuperation valve.

References Cited

UNITED STATES PATENTS

| | | |
|---|---|---|
| 1,539,196 | 5/1925 | Litten. |
| 2,629,462 | 2/1953 | Peek. |
| 3,150,747 | 9/1964 | Bliven et al. _________ 188—88 |
| 2,783,859 | 3/1957 | Patriquin. |
| 3,378,110 | 4/1968 | Parrish. |

FOREIGN PATENTS

| | | |
|---|---|---|
| 227,397 | 3/1960 | Australia. |
| 111,974 | 9/1964 | Czechoslovakia. |
| 696,206 | 8/1953 | Great Britain. |

GEORGE E. A. HALVOSA, *Primary Examiner.*